(12) United States Patent
Shoemaker

(10) Patent No.: US 6,758,292 B2
(45) Date of Patent: Jul. 6, 2004

(54) INTERLOCK SYSTEM AND A DETENT SWITCH THEREFOR

(75) Inventor: Jim Milton Shoemaker, Horicon, WI (US)

(73) Assignee: Deere & Company, Moline, IL (US)

( * ) Notice: Subject to any disclaimer, the term of this patent is extended or adjusted under 35 U.S.C. 154(b) by 64 days.

(21) Appl. No.: 10/217,300

(22) Filed: Aug. 12, 2002

(65) Prior Publication Data

US 2004/0026138 A1 Feb. 12, 2004

(51) Int. Cl.[7] .............................................. B60K 25/06
(52) U.S. Cl. ................................................... 180/53.6
(58) Field of Search ........................... 180/53.1–53.61, 180/53.7, 53.8, 315; 172/74, 79, 83, 261

(56) References Cited

U.S. PATENT DOCUMENTS

| | | | |
|---|---|---|---|
| 3,413,578 A | 11/1968 | Dennison | |
| 5,408,058 A | 4/1995 | Homik et al. | 200/50 |
| 5,616,964 A * | 4/1997 | Peterson, Jr. | 307/9.1 |
| 5,645,135 A * | 7/1997 | Peterson, Jr. | 180/272 |
| 5,683,071 A | 11/1997 | Gibson et al. | 251/32 |
| 5,994,857 A | 11/1999 | Peterson, Jr. et al. | 318/282 |
| 6,173,225 B1 * | 1/2001 | Stelzle et al. | 701/50 |
| 6,316,891 B1 | 11/2001 | Hough | 318/282 |
| 6,386,303 B1 * | 5/2002 | Zibuschka et al. | 180/53.3 |

* cited by examiner

Primary Examiner—Paul N. Dickson
Assistant Examiner—Laura B. Rosenberg

(57) ABSTRACT

A PTO switch for the attachment drive of a lawn and garden tractor includes a solenoid activated detent to retain the normally off switch in an on position. The switch includes an interlock override position for permitting a function such as mow in reverse. An interlock circuit interrupts drive to the attachment under certain conditions. Once drive is interrupted for any reason, the solenoid deactivates and the switch is moved to the off position so that PTO switch position corresponds to attachment drive condition, even when the drive is interrupted by means other than movement of the switch.

16 Claims, 2 Drawing Sheets

INTERLOCK SYSTEM AND A DETENT SWITCH THEREFOR

FIELD OF THE INVENTION

The present invention relates generally to lawn and garden tractors or similar vehicles, and more specifically to an interlock circuit and detent switch for such a vehicle.

BACKGROUND OF THE INVENTION

Vehicles such as some lawn and garden tractors with PTO driven attachments include an interlock circuit with several functions including the prevention of PTO operation when the vehicle is placed in reverse and stopping of the engine when the operator leaves the seat. Under certain conditions, operation of the PTO while the vehicle is in reverse is necessary. Various override systems have been proposed for this purpose. For example, one type of available override system on a mower allows PTO operation when the vehicle is backing up, but only after the PTO is automatically disconnected during the shift into reverse. Another type requires the operator to continuously push a switch during reverse operation. Further types are shown in U.S. Pat. Nos. 6,316,891 and 5,994,857 of common ownership with the present application.

Problems with some of the previously available systems is that the PTO switch can remain in the on position under certain conditions when relays have been deactivated by the interlock system and the engine stops or the PTO is disengaged. In the engine kill situation, the operator must first return the PTO switch to the off position to restart the engine, but often the operator initially fails to notice that the PTO switch is on and tries other options first. When PTO operation is interrupted, the operator must reactivate the PTO by moving the switch back to the on position. Although such systems have provided the necessary interlock and override functions, they are not as intuitive and user-friendly as systems wherein the position of the PTO switch actually corresponds to the operational state of the PTO.

SUMMARY OF THE INVENTION

It is therefore an object of the present invention to provide an improved interlock system for a vehicle such as a lawn and garden tractor. It is another object to provide such a system which overcomes most or all of the aforementioned problems.

It is a further object of the present invention to provide an improved interlock system for a vehicle such as a lawn and garden tractor with a PTO or similar attachment drive switch wherein the on and off positions of the switch correspond directly to the on and off conditions of the driven attachment, even if the attachment drive is disabled or the engine is stopped by action of an interlock system.

It is yet another object of the present invention to provide an improved interlock system for a vehicle such as a lawn and garden tractor with a bypass circuit allowing operation in reverse under certain conditions. It is a further object to provide such a circuit with an improved PTO or attachment drive switch wherein switch position corresponds directly to the PTO or attachment drive condition. It is another object to provide such a circuit having a switch that moves to the off position if the vehicle engine is shut down or if the interlock circuit is operated to disable drive to the attachment.

It is another object of the present invention to provide an improved switch for controlling drive to an attachment on a lawn and garden tractor or similar vehicle. It is still another object to provide such a switch which is particularly useful for interlock circuits with a bypass system to allow operation of an attachment in reverse under certain conditions.

It is yet another object to provide such an improved switch for controlling drive to an attachment on a lawn and garden tractor or similar vehicle, the switch including an actuation device to move the switch handle to an off position in response to an interlock circuit on the vehicle interrupting drive to the attachment so that switch position corresponds to the actual attachment on or off condition. It is a further object to provide such a switch which returns to the off position when the engine is killed.

A PTO switch for the attachment drive of a lawn and garden tractor includes a solenoid activated detent to retain the normally off switch in an on position. The switch includes an interlock override position for permitting a function such as mow in reverse. An interlock circuit interrupts drive to the attachment under certain conditions. Once drive is interrupted for any reason, the solenoid deactivates and the switch is moved to the off position so that PTO switch position corresponds to attachment drive condition, even when the drive is interrupted by means other than movement of the switch. Since the switch is returned to the off position, the problems associated with the operator failing to notice that the PTO switch is on are reduced or eliminated. Machine disruption and operator frustration are minimized, and the time necessary for the operator to get the machine back up and running after an engine kill or PTO interruption is reduced.

DESCRIPTION OF THE PREFERRED EMBODIMENT

Figure 1:
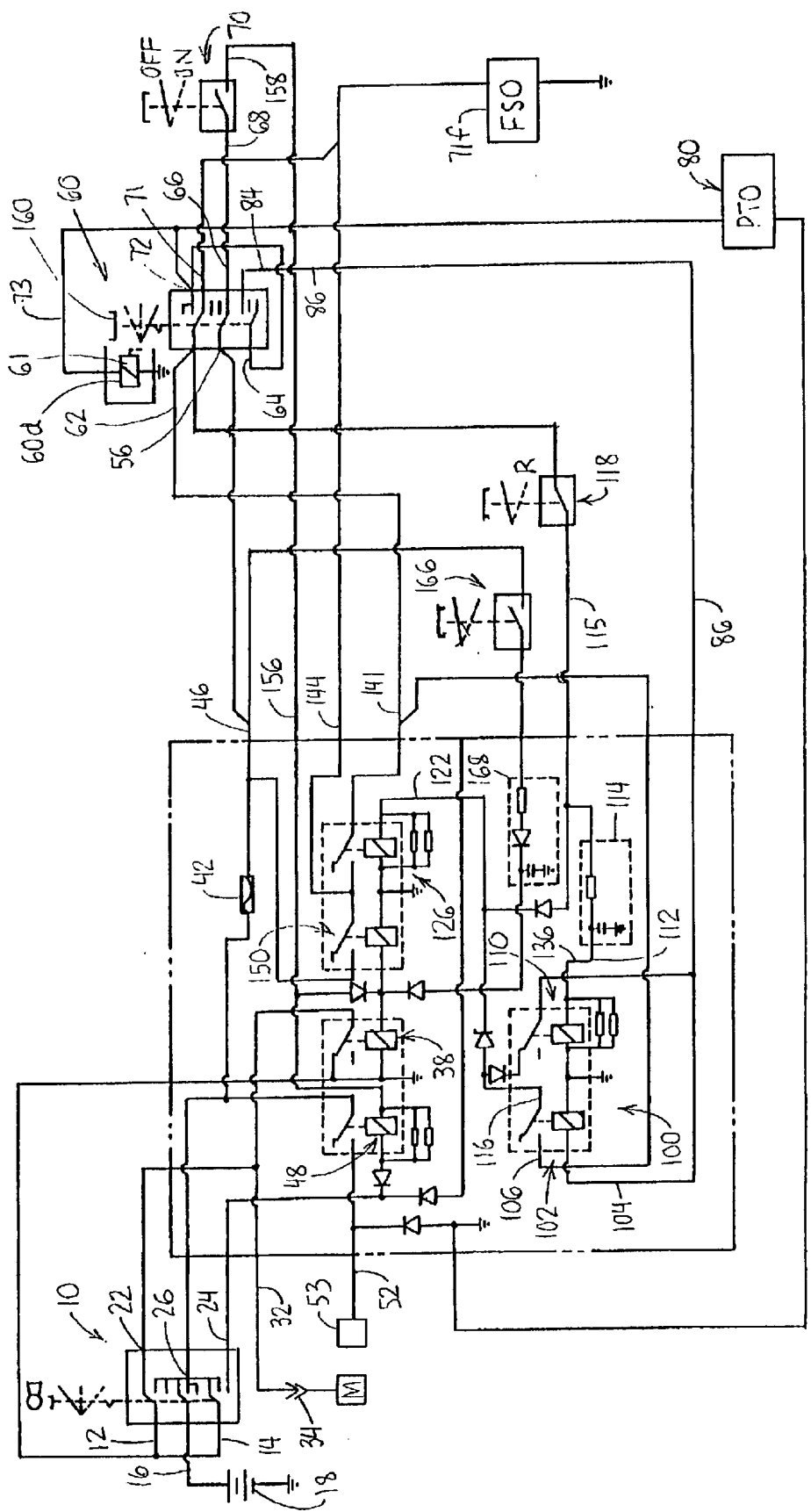
FIG. 1 is a circuit diagram for the electrical circuit of a vehicle such as a lawn and garden tractor having a PTO switch for activating drive to an attachment and an interlock circuit portion for interrupting the drive under certain operating conditions.

Referring now to FIG. 1, therein is shown circuit schematic for a vehicle such as a lawn and garden tractor having an ignition or key switch 10 with switch input terminals 12 and 14 connected to ground and an input terminal 16 connected to the source of electrical power 18 on the vehicle. The switch 10 includes an off (uppermost) position, a run (center) position, and a start (lowermost) position. A closed path is provided from the terminal 12 to an output terminal 22 only when the switch 10 is in the off position as shown. An output terminal 26 is connected to the input terminal 16 and to the source of power 18 when the switch 10 is in the run or the start position. A terminal 24 is connected to ground through the terminal 14 only when the switch 10 is in the start position.

The terminal 22 is connected by line 32 to a magneto shut-down terminal 34 and to the switched input terminal of a magneto relay 38 to assure engine kill when the ignition switch 10 is moved to the off position. The terminal 26 is connected through a fuse 42 to a switched power line 46 and to the switched input terminal of a start relay 48. The start relay 48 is activated and powers a line 52 to the starter 53 when certain preselected conditions on the vehicle are satisfied and the switch 10 is moved to the start position.

The switched power line 46 is connected to a central input terminal 56 (FIG. 1) of a special solenoid latched PTO switch 60 having off, on, and momentary on positions and additional input terminals 62 and 64. The switch 60 is biased to the off position (solid lines of FIG. 3) and held in the on and momentary on positions by a detent structure 60d having a solenoid 61. A set of terminals 64 includes central output terminal 66 connected to an input terminal 68 of a park brake switch 70 to provide power from the switched power line 46 to the terminal 68 only if the PTO switch 60 is in the off position. A first output terminal 71 of the PTO switch 60 is connected to a fuel shut-off solenoid 71f and, when the PTO switch is in the off position, to the input terminal 62. A second output terminal 72 is connected to the input terminal 64 when the switch 60 is in either the on or momentary on position. The terminal 72 is connected via line 73 to the control input of the solenoid of the detent structure 60d so that when the terminal 62 is powered and the PTO switch 60 is in either the on or momentary on position the detent structure 60d will be activated to maintain the PTO switch on. The activation coil of an electric PTO clutch 80 is also connected to the terminal 72 so that the accessory drive is on when the PTO switch is in the on or momentary on position and the terminal 62 is powered.

A PTO switch output terminal 84 is connected by a latch power line 86 to interlock bypass relay structure 100. A current path is established from the terminal 62 through the terminals 72, 64 and 84 when the switch 60 is pulled up to the momentary on position to activate the bypass system and permit operations such as mow in reverse under certain conditions.

The relay structure 100 includes a bypass latching relay 102 having a control input 104 connected by the line 86 to the terminal 84 of the PTO switch 60 to power the relay when the switch 60 is pulled to the momentary on position. A terminal 106 is connected to the PTO input terminal 62. The relay structure 100 also includes an unlatching relay 110 having a control input 112 connected by a delay circuit 114, line 115 and a normally closed transmission or reverse sensing switch 118 to the PTO switch terminal 62. The switch 118 opens when the vehicle is placed in reverse. When the line 86 is powered and the vehicle is out of reverse (switch 118 closed as shown) the unlatching relay 110 will be activated. The latching relay 102 includes a switched output having a terminal 116 connected through a blocking diode to a PTO control input 122 of a PTO relay 126. The PTO control input 122 is also connected through a blocking diode and the line 115 to the output terminal of the reverse sensing switch 118. The PTO relay 126 will activate only if the reverse sensing switch 118 is closed (vehicle not in reverse) with power applied to the input of the switch 118 (PTO on and park brake off) or if the relay 102 is activated (PTO switch 60 in the momentary on position) with the PTO switch terminal 62 powered. The output terminal of the switched output 116 is connected by a diode to the upper terminal of the switched output 136 of the unlatching relay 110 so when the relay 110 is in the position shown (not activated), a closed path is provided between the switched output 116 of the latching relay 102 and the control input 104 of the relay 102 to bootstrap the relay 102 in the on position, provided the line 86 is powered and the relay 110 remains inactivated.

To bootstrap the latch relay 102 to the on condition after interruption requires temporarily moving the PTO switch 60 up to the momentary on position while the PTO relay 126 is activated. Once activated by movement of the PTO switch 60 to the momentary on position, the latch 102 will remain bootstrapped on until the unlatch relay 110 opens the bootstrap circuit or power to the terminal 106 is interrupted for any reason.

The PTO relay 126 includes a switched output having one terminal connected by a line 141 to the input terminal 62 of the PTO switch 60 and to the terminal 106. An opposite terminal of the relay 126 is connected by a line 144 to the output terminal 71 of the PTO switch 60. The output terminal and the line 144 are also connected to a switched output of an ignition relay 150. The relay 150 includes a control input connected by a blocking diode and a line 156 to an output terminal 158 of the brake switch 70 to provide a current path from the switched power line 46 to the ignition relay control input through the terminals 56, 66 of the PTO switch 60 and terminal 68 of the brake switch 70 if the PTO switch 60 is off and the brake is on. A second path from the switched power line 46 to the control input of the ignition relay 150 includes an operator presence switch 166 connected to a delay circuit 168 and a blocking diode. The second path with operator presence switch 166 provides activation of the ignition relay 150 when the operator is at his station on the vehicle and switched power is on. The delay circuit 168 prevents nuisance interruptions of engine operation caused by seat bounce or the like.

The magneto grounding relay 38 includes a control input connected through diodes to line 156 from the brake switch 70 and to the output of the operator presence switch 166. When the control input of the ignition relay 38 is unpowered (shown), the magneto grounds to assure engine kill when power is interrupted, for example, shortly after opening of the switch 166 when the operator leaves the operator station. The start relay 48 has a control input connected by the line 156 to the terminal 158 of the brake switch 70 so that the starter can only be activated if the terminal 158 is powered, that is, if the brake is on and the PTO switch 60 is off. The switch 10, when in the start position, grounds one side of a control coil of the start relay 48 through a diode and the terminal 24 to provide cranking power to the starter if the line 156 is powered (PTO off and brake on).

If further details of circuit operation are desired, reference may be had to the aforementioned U.S. Pat. No. 5,994,857 patent. Although the present switch structure is particularly useful with an interlock circuit described above for providing attachment drive under limited conditions while a vehicle is in reverse, the structure may be utilized with other circuits with both a control switch and a disabling circuit to assure the switch position corresponds to the actual operating state when the power to the structure is interrupted by the disabling circuit rather than the control switch.

Figure 2:
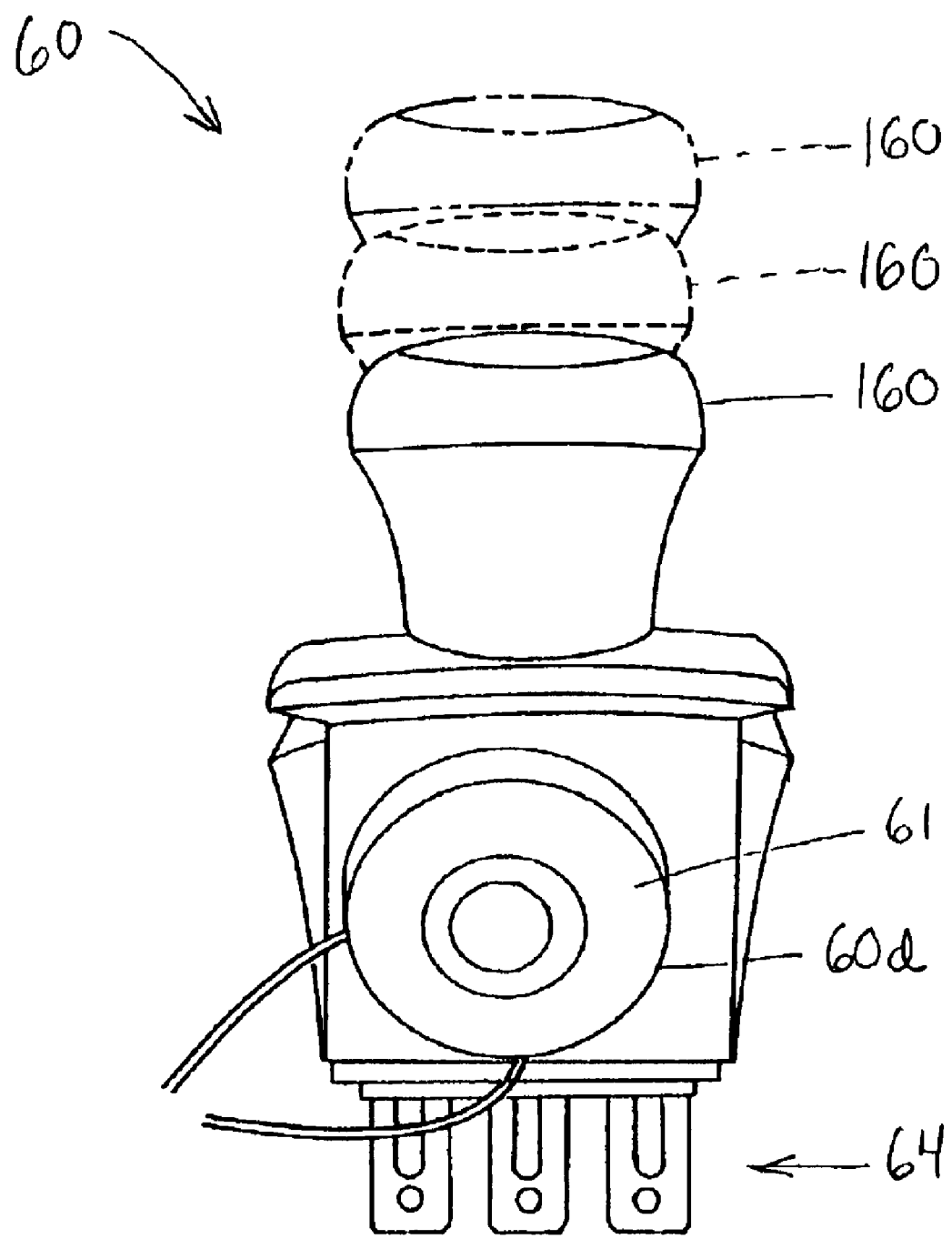
FIG. 2 is a view of a PTO switch for the circuit of FIG. 1 having a solenoid operated detent for returning the switch to an off position when drive to the attachment is interrupted.

The switch 60 includes a knob or other switch actuator 160 spring-biased to an off position (the position shown in FIG. 1 and by the solid lines of FIG. 2). The knob 160 will return to the off position when released unless the solenoid 61 is powered to actuate the detent which holds the knob in the on position. The solenoid 61 is actuated if the terminal 72 of the switch 60 is powered and the PTO clutch 80 is on. If power is interrupted to the clutch 80 for any reason, the switch knob 160 will return to the off position to provide an indication of the actual operating condition of the clutch and attachment drive system. Therefore, the operator will immediately recognize the need to return the knob or actuator 160 to the on position to restart the accessory drive after the PTO is shut off by the interlock circuit or by other interruption of power.

In operation, assuming the PTO switch 60 is in the on position and the PTO is activated, the detent structure 60d retains the switch 60 in the on position. If mowing in reverse is desired, the operator simply pulls up on the knob 160 to move the switch to the bypass or temporary on position while the terminal 72 is powered and the PTO is on. Reverse gear is selected while holding the knob 160 in the temporary on position thereby opening the switch 118 and deactivating the relay 110 to close the bootstrap loop and maintain power to the PTO relay 126 after the knob 160 is released and the switch 60 returns to the on position. Thereafter, returning the vehicle to a neutral or forward drive condition causes the switch 118 to close and deactivate the bootstrap on condition. Power is delivered via line 115 and the switch 118 to the control input 122 of the PTO relay 126 to maintain the PTO on. If power is interrupted to the PTO relay 126 for any reason, the PTO will deactivate and the knob 160 will return to the off position. Such interruption can be the result of numerous factors, such as powering off of the vehicle, interlock activation, placing the vehicle in reverse without pulling the knob 160, and the like. Once the PTO is deactivated or the engine is killed, the knob 160 must be returned to the on position with proper interlock conditions met before the PTO will again activate.

Having described the preferred embodiment, it will become apparent that various modifications can be made without departing from the scope of the invention as defined in the accompanying claims.

I claim:

1. In a lawn and garden vehicle having an engine, a power take off (PTO) for operating a driven attachment from the engine, a ground drive for providing vehicle drive and non-drive conditions including a selector for selecting either forward or reverse vehicle operation, an interrupt circuit limiting operation of the vehicle under certain conditions, positionable switch structure comprising:
    a PTO switch connected to the PTO and having an on position and off position;
    an activatable detent holding the switch in the on position; and
    activation structure connected to the detent and causing the switch to move to the off position when operation of the accessory is limited by the interrupt circuit so that the position of the PTO switch corresponds to the actual operating state of the PTO.

2. The vehicle as set forth in claim 1 wherein the PTO switch has on and interrupt circuit override positions.

3. The vehicle as set forth in claim 2 wherein the override position comprises a position for permitting vehicle operation in reverse that otherwise is limited by the interrupt circuit.

4. The vehicle as set forth in claim 1 wherein the activation structure is operably connected to the interrupt circuit and is responsive to the limiting of operation by the interlock circuit.

5. In a utility vehicle having an engine, a drive for operating a driven attachment, and an interlock circuit limiting drive to the attachment under certain conditions, switch structure comprising:
    an attachment switch connected to the drive and having an on position for activating the drive and an off position for turning off the drive, wherein the interlock circuit limits drive to the attachment independently of the position of the switch;
    an activatable detent holding the switch in the on position; and
    wherein the interlock circuit is connected to the detent and causes the switch to move to the off position in response to the interlock circuit limiting drive to the attachment so that the position of the switch corresponds to the operating condition of the drive.

6. The switch structure as set forth in claim 5 wherein the switch detent includes a solenoid, the switch includes an input terminal and an output terminal, and further comprising a line connecting the output terminal to the solenoid to activate the solenoid when the switch is in the on position and the input terminal is powered.

7. A drive switch for a vehicle having an electrically activated accessory drive and an interlock circuit for interrupting drive to the accessory under certain conditions, the drive switch comprising:
    a selector control having an accessory drive on position and an accessory drive off position; and
    a selector control detent having an actuator adapted for connection to the interlock circuit, the detent activatable in response to the interlock circuit interrupting drive to the accessory to return the selector control to the accessory drive off position even if the drive is interrupted by the interlock circuit independently of positioning of the selector control.

8. The drive switch as set forth in claim 7 wherein the selector control includes an interlock override position.

9. The drive switch as set forth in claim 7 including a switched power input terminal, and wherein the selector control detent includes a solenoid responsive to power condition of the input terminal.

10. The drive switch as set forth in claim 9 wherein the drive switch includes an accessory drive output terminal connected to the solenoid.

11. A drive control switch for a vehicle having an electrically activated accessory drive and an interlock circuit connected to the accessory drive for changing condition of the drive to the accessory, the drive control switch comprising:
    a selector control having an accessory drive first condition position and an accessory drive second condition position, the selector control biased to the first condition position;
    a selector control detent;
    retaining means for selectively maintaining the selector control in the second drive condition position against the bias;
    means connecting the retaining means to the interlock circuit, wherein the retaining means is responsive to the interlock circuit changing the condition of the drive to selectively release the selector control to return to the first condition position so that selector control position corresponds to the drive condition.

12. The drive control switch as set forth in claim 11 wherein the selector control includes an interlock override position.

13. The drive control switch as set forth in claim 11 wherein the selector control detent includes a solenoid.

14. The drive control switch as set forth in claim 13 including a switch output terminal connected to the solenoid.

15. The drive control switch as set forth in claim 11 wherein the selector control detent includes a control input, the drive control switch further including a power input terminal, the drive control switch selectively providing a current path from the power input terminal to the control input.

16. The drive control switch as set forth in claim 11 wherein the means connecting the retaining means to the interlock circuit includes means for maintaining the switch in an on condition when the state of the interlock circuit indicates that an accessory drive condition should be allowed.

* * * * *